US012624564B2

(12) United States Patent
Harmon et al.

(10) Patent No.: US 12,624,564 B2
(45) Date of Patent: May 12, 2026

(54) SHELTER SYSTEM HAVING DEPLOYABLE PLATFORM

(71) Applicant: Ford Global Technologies, LLC, Dearborn, MI (US)

(72) Inventors: Michael John Harmon, Northville, MI (US); Amil Vira, Irvine, CA (US); Shane Patton, San Francisco, CA (US); Michael Lozano, Detroit, MI (US); Bradford Zercoe, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 18/435,400

(22) Filed: Feb. 7, 2024

(65) Prior Publication Data

US 2025/0250814 A1 Aug. 7, 2025

(51) Int. Cl.
| | |
|---|---|
| *E04H 15/06* | (2006.01) |
| *B60P 3/34* | (2006.01) |
| *B60P 3/39* | (2006.01) |
| *E04H 15/38* | (2006.01) |
| *E04H 15/48* | (2006.01) |

(52) U.S. Cl.
CPC ............... *E04H 15/06* (2013.01); *B60P 3/34* (2013.01); *B60P 3/39* (2013.01); *E04H 15/38* (2013.01); *E04H 15/48* (2013.01)

(58) Field of Classification Search
CPC ............... B60P 3/39; B60P 3/34; B60P 3/341
USPC ...................................... 135/88.16
See application file for complete search history.

(56) References Cited

U.S. PATENT DOCUMENTS

| | | | | |
|---|---|---|---|---|
| 2,291,900 | A | 8/1942 | Jimmes | |
| 3,021,852 | A | 2/1962 | Hoffman | |
| 3,620,235 | A * | 11/1971 | Du Plessis | B60P 3/38 135/904 |
| 3,658,375 | A * | 4/1972 | Bowen | B60P 3/341 296/26.02 |
| 3,744,841 | A * | 7/1973 | Schmidt | B60P 3/34 52/64 |
| 4,111,479 | A * | 9/1978 | Rizzotto, Sr. | B60P 3/38 135/150 |
| 4,176,873 | A * | 12/1979 | Barr | B60P 3/38 296/210 |
| 5,335,960 | A * | 8/1994 | Benignu, Jr. | B60P 3/341 296/100.18 |
| 5,788,319 | A * | 8/1998 | Pruitt | B60P 3/341 296/173 |

(Continued)

FOREIGN PATENT DOCUMENTS

| | | | | |
|---|---|---|---|---|
| CN | 113928430 A * | 1/2022 | ............. | H02S 20/30 |
| CN | 120135055 A * | 6/2025 | ............. | B60P 3/36 |

(Continued)

*Primary Examiner* — David R Dunn
*Assistant Examiner* — Danielle Jackson
(74) *Attorney, Agent, or Firm* — Vichit Chea; Carlson, Gaskey & Olds, P.C.

(57) ABSTRACT

A shelter system for a truck includes a platform assembly that can pivot back-and-forth between a stowed position and a deployed position. The platform assembly spans a bed of a truck when in the stowed position. The platform assembly is disposed over a cab of the truck when in the deployed position. A tent covers the platform assembly when the platform assembly is in the deployed position.

19 Claims, 5 Drawing Sheets

(56)  References Cited

U.S. PATENT DOCUMENTS

| | | | |
|---|---|---|---|
| D574,315 S * | 8/2008 | Swails | D12/401 |
| 8,418,708 B2 * | 4/2013 | Benish | E04H 15/06 |
| | | | 135/88.14 |
| 8,567,423 B1 * | 10/2013 | Combs, Jr. | E04H 15/32 |
| | | | 135/96 |
| 10,086,684 B1 | 10/2018 | Stamm, Jr. | |
| 10,309,120 B1 * | 6/2019 | Noel, II | B60P 3/32 |
| 10,538,152 B1 * | 1/2020 | Singer | B60J 7/108 |
| 10,596,951 B1 | 3/2020 | Williams | |
| 10,829,028 B2 * | 11/2020 | Delgadillo, Jr. | B60J 7/1657 |
| 11,059,414 B2 * | 7/2021 | Dorn | E04H 15/06 |
| 11,371,255 B2 * | 6/2022 | Frederickson | B60J 7/1621 |
| 11,529,909 B2 * | 12/2022 | Singer | B60P 7/14 |
| 11,565,645 B2 * | 1/2023 | Salter | B60P 3/341 |
| 11,739,555 B2 * | 8/2023 | Burnett | E04H 15/48 |
| | | | 135/88.07 |
| 11,840,857 B1 * | 12/2023 | Gauthier | B60P 3/341 |
| 11,988,006 B1 * | 5/2024 | Gauthier | B60P 3/341 |
| 12,018,503 B2 * | 6/2024 | Davis | B60P 3/38 |
| 12,091,097 B2 * | 9/2024 | Harmon | E05F 15/605 |
| 12,252,059 B2 * | 3/2025 | King | B60P 3/34 |
| 12,391,102 B2 * | 8/2025 | Wilkerson | B60P 3/341 |
| 2019/0292806 A1 | 9/2019 | Attema | |
| 2022/0177052 A1 | 6/2022 | Harmon et al. | |
| 2024/0034419 A1 * | 2/2024 | Pakkam | B60J 7/141 |
| 2024/0268574 A1 * | 8/2024 | Gauthier | B32B 5/18 |
| 2025/0214501 A1 * | 7/2025 | King | B60P 3/34 |

FOREIGN PATENT DOCUMENTS

| | | | |
|---|---|---|---|
| KR | 102400916 B1 * | 5/2022 | B60P 3/34 |
| KR | 20240156439 A * | 10/2024 | B60P 3/34 |

* cited by examiner

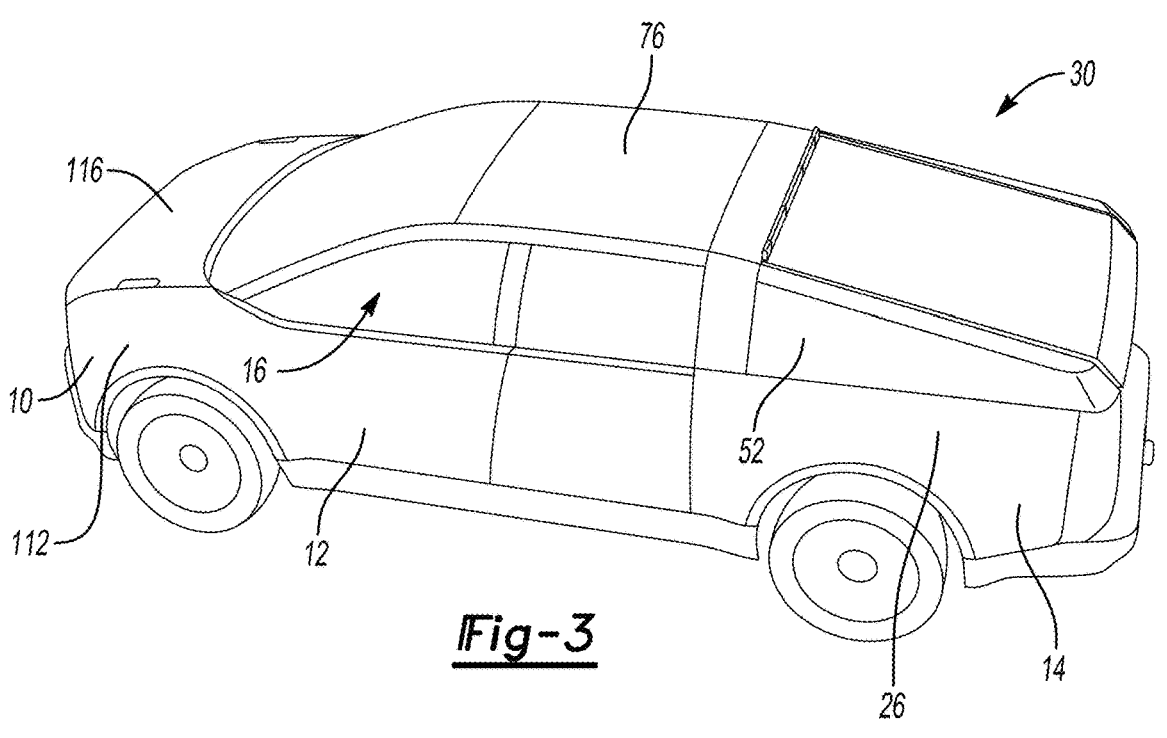
_Fig-3_
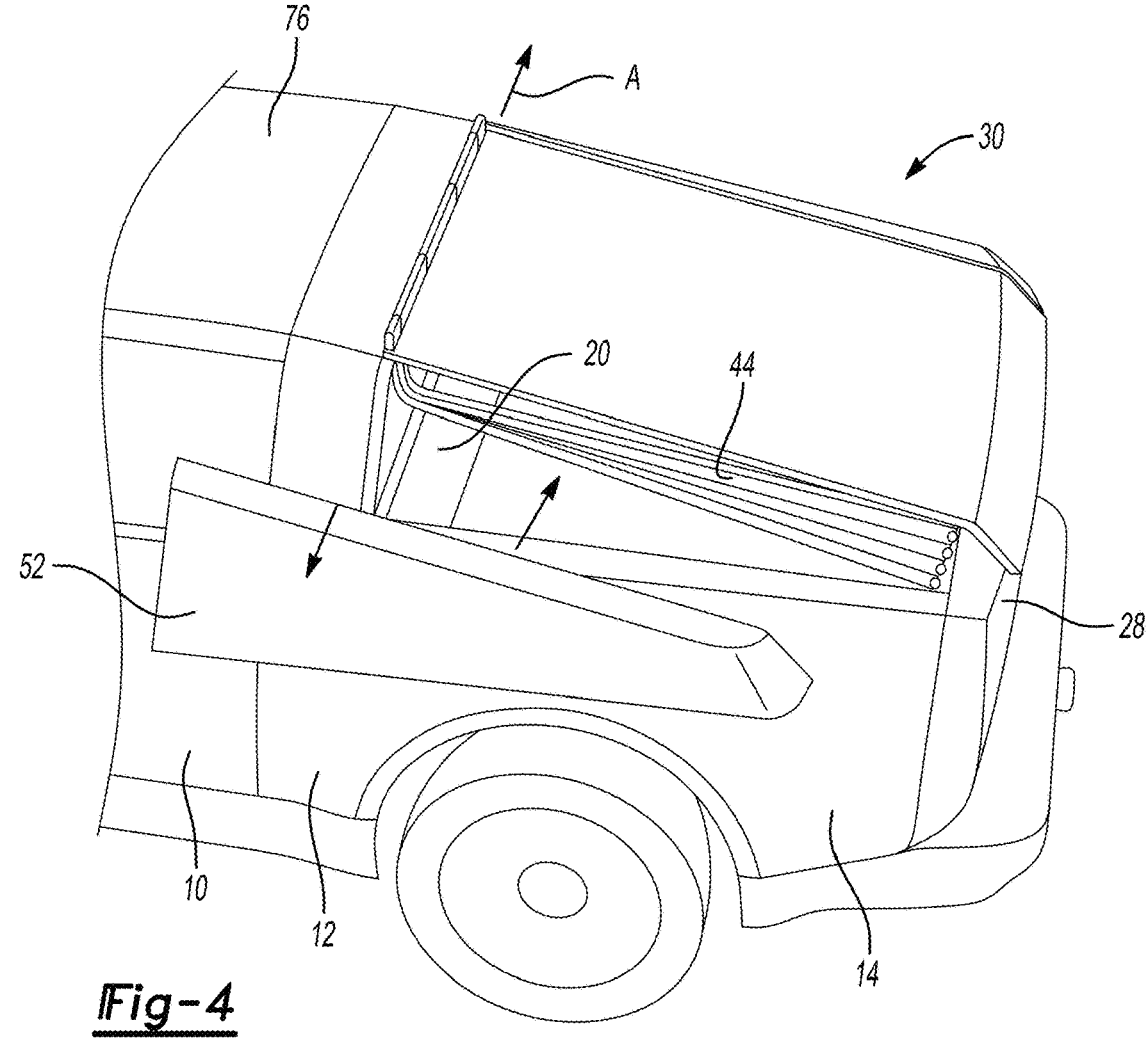
_Fig-4_

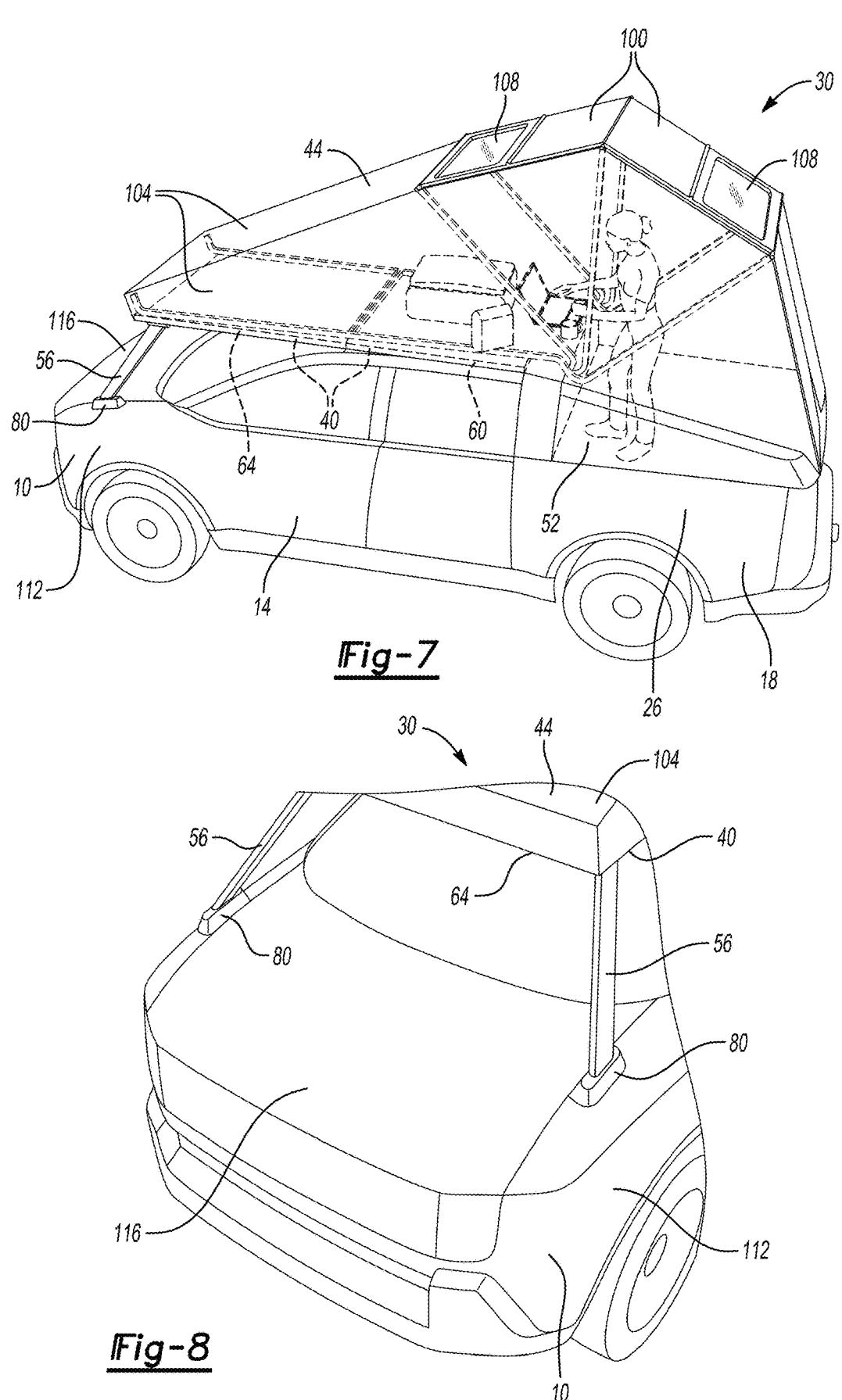
_Fig-7_
_Fig-8_

SHELTER SYSTEM HAVING DEPLOYABLE PLATFORM

TECHNICAL FIELD

This disclosure is directed toward a shelter system that can be used with a truck and, more particularly, to a shelter system that has a deployable platform that extends over a roof of the truck when deployed.

BACKGROUND

A typical pickup truck has a cab providing a passenger compartment and a bed providing a cargo area. A cab back can separate the passenger compartment from the cargo area. In some pickup trucks, such as unibody pickup trucks, the cab back can provide a front wall of the bed.

SUMMARY

In some aspects, the techniques described herein relate to a shelter system for a truck, including: a platform assembly that can pivot back-and-forth between a stowed position and a deployed position, the platform assembly spanning a bed of a truck when in the stowed position, the platform assembly disposed over a cab of the truck when in the deployed position; and a tent that covers the platform assembly when the platform assembly is in the deployed position.

In some aspects, the techniques described herein relate to a shelter system, wherein the platform assembly in the stowed position slopes downward from an upper, rear area of the cab to a tailgate of the truck.

In some aspects, the techniques described herein relate to a shelter system, wherein a cab back of the truck is configured to open to provide a passthrough between a passenger compartment of the truck and the bed of the truck.

In some aspects, the techniques described herein relate to a shelter system, wherein the platform assembly includes a first panel and a second panel pivotably connected to each other, the first panel and the second panel folded when the platform assembly is in the stowed position, the first panel and the second panel unfolded when the platform assembly is in the deployed position.

In some aspects, the techniques described herein relate to a shelter system, wherein the second panel extends forward past a roof of the cab when the platform assembly is in the deployed position.

In some aspects, the techniques described herein relate to a shelter system, further including at least one support leg that extends from the second panel to the truck to support the second panel when the platform assembly is in the deployed position.

In some aspects, the techniques described herein relate to a shelter system, wherein the at least one support leg is pivotably connected to the second panel.

In some aspects, the techniques described herein relate to a shelter system, wherein the at least one support leg includes a first leg connectable to a first mounting point on a driver side of a hood of the truck, and a second leg connectable to a second mounting point on a passenger side of the hood of the truck.

In some aspects, the techniques described herein relate to a shelter system, wherein the first leg is connectable to the first mounting point through a first latch, and the second leg is connectable to the second mounting point through a second latch.

In some aspects, the techniques described herein relate to a shelter system, wherein the first mounting point and the second mounting point are pivotably back-and-forth between a mounting position and a concealed position.

In some aspects, the techniques described herein relate to a shelter system, further including a frame assembly that supports the tent when the platform assembly is in the deployed position.

In some aspects, the techniques described herein relate to a shelter system, further including a frame assembly having a plurality of support spokes that radiate from a pivot axis and are fanned out about the pivot axis when the platform assembly is in the deployed position, wherein some of the plurality of support spokes support the platform assembly and some of the plurality of support spokes support the tent.

In some aspects, the techniques described herein relate to a shelter system, wherein the pivot axis is adjacent an upper, rear corner of a cab of the cab.

In some aspects, the techniques described herein relate to a shelter system, wherein the tent is folded when the platform assembly is the stowed position and is unfolded when the platform assembly is in the deployed position.

In some aspects, the techniques described herein relate to a shelter system, further including a pair of side panels that cover outboard areas of the platform assembly and the tent when the platform assembly is in the stowed position.

In some aspects, the techniques described herein relate to a method of establishing a shelter for a truck, including: using a platform assembly as an aerodynamic shield that spans a bed of a truck when the platform assembly is in a stowed position; and pivoting the platform assembly to a deployed position where the platform assembly spans a roof of the truck.

In some aspects, the techniques described herein relate to a method, further including unfolding a tent during the pivoting, the tent covering the platform assembly when the platform assembly is in the deployed position.

In some aspects, the techniques described herein relate to a method, further including rotating a plurality of support spokes about a pivot axis when transitioning back-and-forth between the stowed position and the deployed position, the plurality of support spokes radiating from the pivot axis and fanned out about the pivot axis when the platform assembly is in the deployed position, wherein some of the plurality of support spokes support the platform assembly and some of the plurality of support spokes support the tent when the platform assembly is in the deployed position.

In some aspects, the techniques described herein relate to a method, further including supporting a portion of the platform assembly that extends forward of the roof with at least one support leg that extends from the platform assembly to the truck.

In some aspects, the techniques described herein relate to a method, wherein the platform assembly includes a first panel and a second panel that are folded together when the platform assembly is in the stowed position and that are unfolded when the platform assembly is in the deployed position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 3 illustrates the example shelter system of FIG. 2 when the shelter system is attached to the truck.

FIG. 4 illustrates the example shelter system of FIG. 3 with a side panel removed.

FIG. 7 illustrates a perspective view of the example shelter system when the platform assembly is in the deployed position.

FIG. 8 illustrates a close-up view of a front of the truck and the shelter system when the platform assembly is in the deployed position.

DETAILED DESCRIPTION

This disclosure details a shelter system for a truck. The shelter has a platform assembly that can be deployed and used by an occupant. The shelter system can be stowed when not needed. When the platform assembly is stowed, the shelter module covers a bed of the truck and can reduce aerodynamic drag as the truck is driven.

Figures 1, 2:
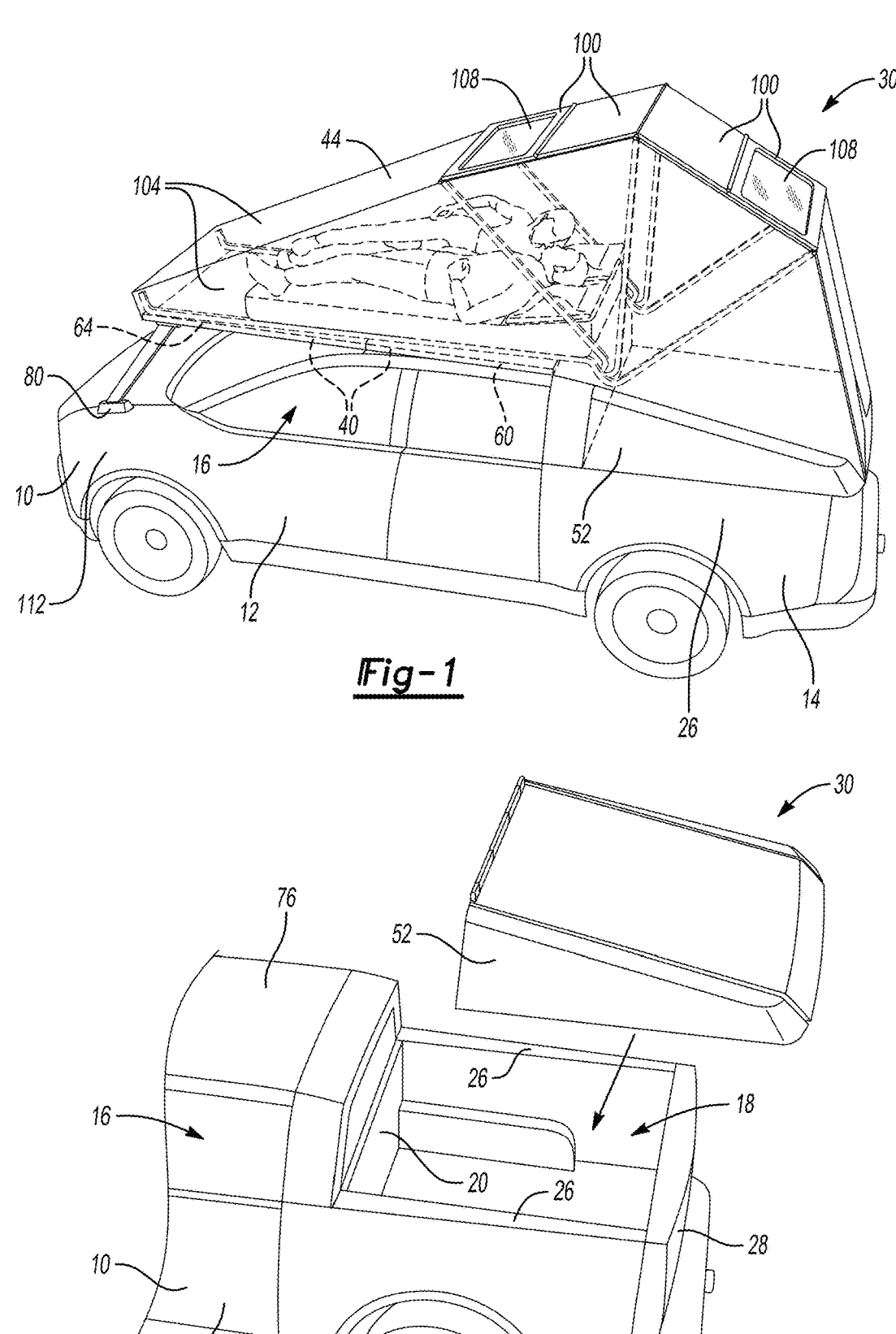
FIG. 1 illustrates a perspective view of an example shelter system that is attached to a truck and when a platform assembly of the shelter system is in a deployed position.
FIG. 2 illustrates the example shelter system with the platform assembly in the stowed position and when the shelter system is detached from the truck.
Figures 5, 6:
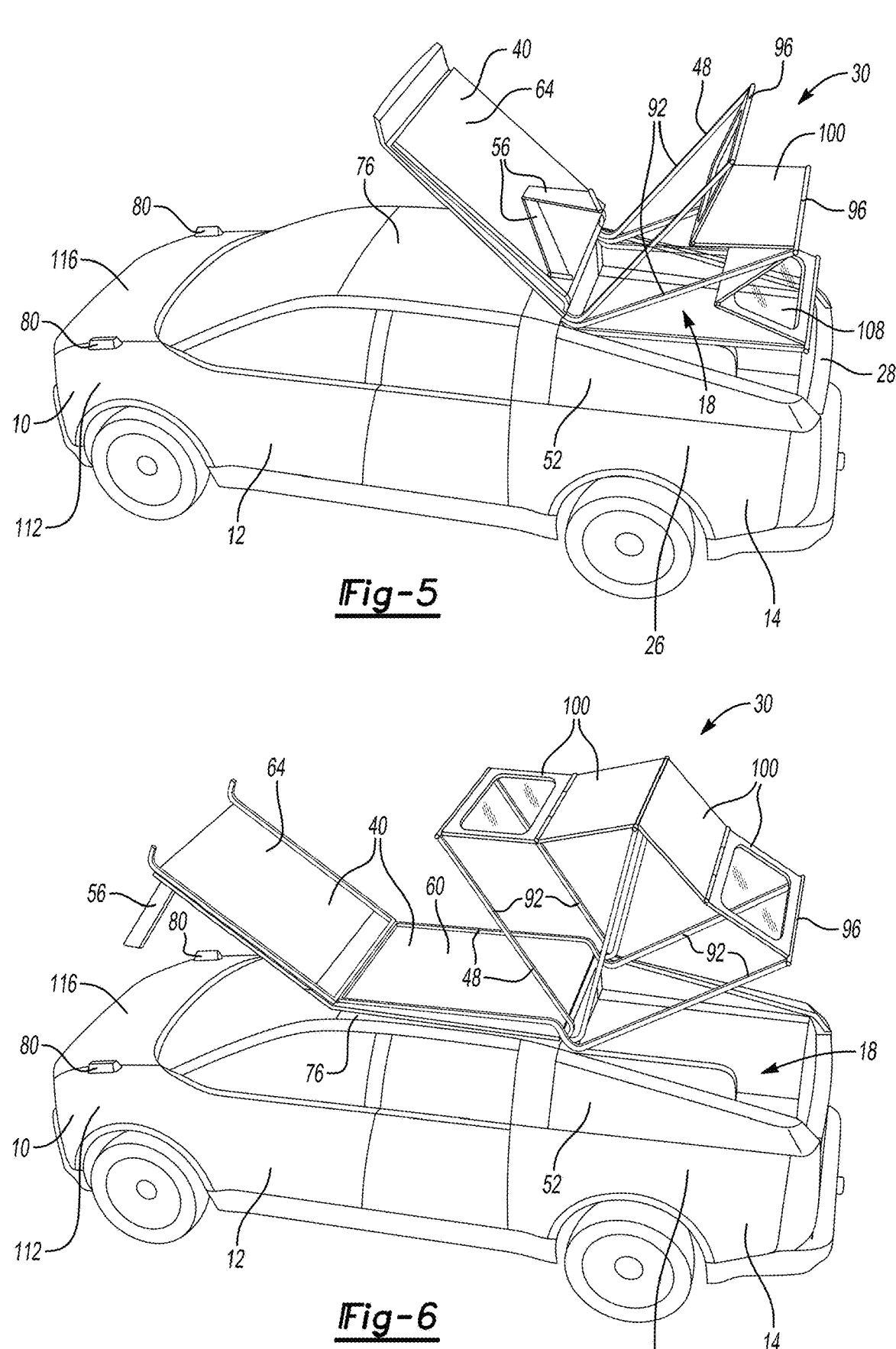
FIG. 5 illustrates the example shelter system of FIG. 3 when the platform assembly is pivoting from the stowed position and with a tent of the shelter system removed to reveal details of the shelter system.
FIG. 6 illustrates a side view of the example shelter system of FIG. 5 with the tent still removed to reveal details and when the platform is pivoting further from the stowed position than in FIG. 5
Figures 9, 10, 11:
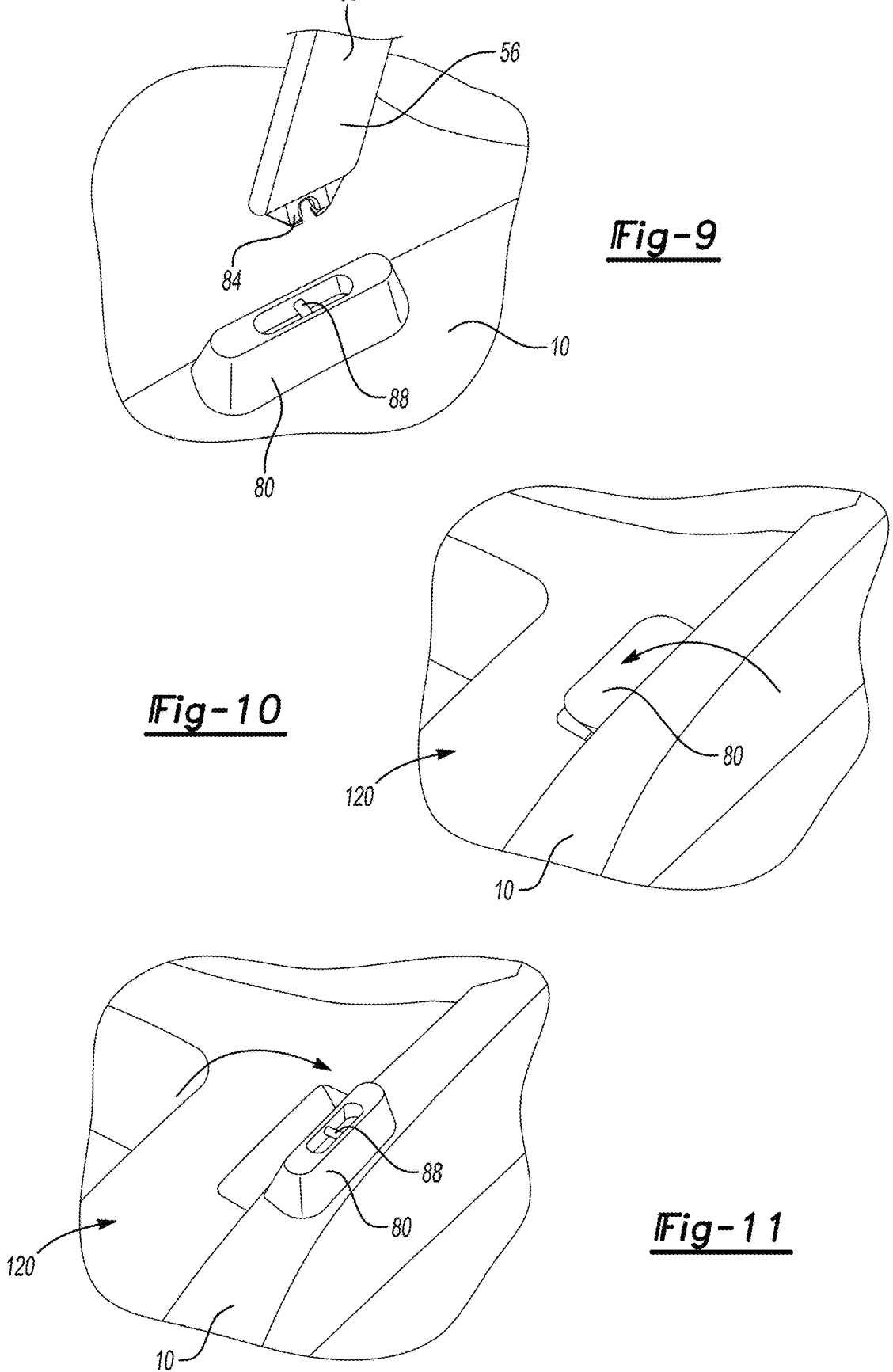
FIG. 9 illustrates a close-up perspective view of a support leg of the shelter system of FIG. 8 moving to a latched position with a mounting point.
FIG. 10 illustrates a close-up view of the mounting point of FIG. 9 in a concealed position.
FIG. 11 illustrates a close-up view of the mounting point of FIG. 9 in a mounting position.

With reference to FIGS. 1 to 3, a truck 10 includes a cab 12 and a bed 14 that is aft the cab 12. Terms like "forward," "aft," "rear," and "rearward" and the like are, for purposes of this disclosure, with reference to an orientation of the truck 10.

The cab 12 includes a passenger compartment 16. The bed 14 includes a cargo area 18. A cab back 20 separates the passenger compartment 16 from the cargo area 18. Sidewalls 26 of the bed 14 establish sides of the cargo area 18. A tailgate 28 can pivot to a closed position to enclose an aft end of the cargo area 18.

The example truck 10 is an electrified vehicle. In particular, the truck 10 is a battery electric vehicle. In another example, the truck 10 could be another type of electrified vehicle, such as a plug-in hybrid electric vehicle (PHEV), or a conventional vehicle.

The example truck 10 includes an electrified powertrain capable of applying a torque from an electric machine (e.g., an electric motor) to drive one or more drive wheels. The truck 10 can include a traction battery pack, which powers the electric machine and, potentially, other electrical loads of the truck 10. The powertrain of the truck 10 may electrically propel the drive wheels either with or without the assistance of an internal combustion engine.

The exemplary truck 10 is a unibody pickup truck. As the truck 10 has a unibody configuration, the cab 12 and the bed 14 are not supported on a vehicle frame that is separate from the cab 12 and the bed 14. In the truck 10, the cab back 20 provides both the back wall of the cab 12 and a front wall of the bed 14. A body-on-frame truck is different than a unibody truck. In a body-on-frame truck, a back wall of the cab is spaced a distance from a front wall of a bed to provide an open gap between the cab and the bed. The back wall of the cab is not directly connected to the front wall of the bed in a body-on-frame vehicle.

A shelter system 30 can be removably mounted to of the truck 10. The example shelter system 30 includes a platform assembly 40, a tent 44, a frame assembly 48, a pair of side panels 52 and at least one support leg 56. The shelter system 30 can be attached to the truck 10 with clamps, mechanical fasteners, clips, or with some other fastening system.

A shelter system 30 can be removably mounted to the truck 10. The example shelter system 30 includes a platform assembly 40, a tent 44, a frame assembly 48, a pair of side panels 52 and at least one support leg 56. The shelter system 30 can be attached to the truck 10 with clamps, mechanical fasteners, clips, or with some other fastening system.

As shown in FIG. 3, when the platform assembly 40 is in the stowed position, the example shelter system 30 can rest on the sidewalls 26 with the platform assembly covering the bed 14 of the truck 10. The platform assembly 40 in the stowed position covers the cargo area 18 and tapers rearward from an upper, rear area of the cab 12 to the tailgate 28.

The platform assembly 40 is in the stowed position when the truck 10 is driven. The platform assembly 40 cannot be moved from the stowed position when the truck 10 is driven. The truck 10 cannot be driven unless the platform assembly 40 is in the stowed position. The shelter system 30 with the platform assembly 40 in the stowed position provides an aerodynamic shield or guide for the truck 10. As the truck 10 is driven, the shelter system 30 and particularly the platform assembly 40 guide a flow of air over the bed 14 and other areas of the truck 10 to decrease aerodynamic drag, which can increase range for the truck 10.

In the stowed position, the platform assembly 40 spans over the bed 14 and, in this example, the platform assembly 40 in the stowed position slopes downward from an upper, rear area of the cab 12 to the tailgate 28 of the truck 10.

When the truck 10 is locked in a stationary position, the platform assembly 40 can be transitioned to the deployed position of FIG. 1. The platform assembly 40 cannot be transitioned to the deployed position unless the truck 10 is locked in a stationary position. The truck 10 remains locked in the stationary position the entire time the platform assembly 40 is in the deployed position. In this position, the platform assembly 40 can be utilized by an occupant for resting or for storing cargo. The tent 44 covers the platform assembly 40 and the cargo area 18 to provide privacy, shade, and protection against the elements. In the deployed position, the platform assembly 40 is disposed over the cab 12. Notably, the sheltered area covered by the tent 44 includes areas that are tall enough for many occupants to stand upright. An occupant can, for example, stand in the cargo area 18 while changing out of a wetsuit while remaining covered by the tent 44.

With reference now to FIGS. 4-7 and continuing reference to FIG. 3, the example platform assembly 40 pivots from the stowed position of FIG. 3 to the deployed position of FIG. 7. The platform assembly 40 pivots about a pivot axis A that is adjacent an upper, rear corner of the truck.

The example platform assembly 40 includes a first panel 60 and a second panel 64 that are pivotably connected to each other. The first panel 60 and the second panel 64 are folded when the platform assembly 40 is in the stowed position. The first panel 60 and the second panel 64 are unfolded when the platform assembly 40 is in the deployed position. The first panel 60 and second panel 64 can be a rigid polymer-based material.

When the platform assembly 40 is in the deployed position, the platform assembly 40—here the second panel 64—extends forward past a roof 76 of the cab 12. The support legs 56 are pivotably connected to the second panel 64 and swing down from the second panel 64 to connect to respective truck mounting points 80. The support legs 56 can then help support the second panel 64 when the platform assembly 40 is in the deployed position.

In this example, the support legs 56 connect to the respective mounting points 80 via latches 84. The mounting points 80 include strikers 88 that are engaged by the latches 84.

The frame assembly 48 includes a plurality of support spokes 92 that radiate from the pivot axis A. The support spokes 92 rotate about the pivot axis A and are fanned out about the pivot axis A as the platform assembly 40 is pivoted to the deployed position. The support spokes 92 are nested together when the platform assembly 40 is in a stowed position.

Some of the support spokes 92 support the first panel 60. Some of the support spokes 92 are connected by cross-members 96 of the frame assembly 48 and used to support the tent 44. The support spokes 92, the cross-members 96, or both could carry lights that illuminate the shelter. The lights can, in some examples, activate automatically when the platform assembly 40 is transitioned to the deployed position.

The pivoting of the platform assembly 40 to the deployed position and the associated fanning out of the support spokes 92 can be automated and driven by a motor in some examples. The motor could also be activated to return the platform assembly 40 to the stowed position.

In the example embodiment, the tent 44 is folded when the platform assembly 40 is in the stowed position and unfolded as the platform assembly 40 is transitioned to the deployed position. As shown in FIG. 4, the side panels 52 can conceal and cover the outboard areas of the tent 44 when folded.

The example tent 44 includes rigid sections 100 and pliable sections 104. The rigid sections 100 retain their general shape when the platform assembly 40 is in the stowed position and in the deployed positions. The pliable sections 104 are puckered when the platform assembly is in the stowed position and smooth out when the platform assembly 40 is in the deployed position.

The tent 44 is draped over the frame assembly 48 when the platform assembly 40 is in the deployed position to establish a sheltered area for cargo and for occupants. The tent 44 can include various pockets to store gear and other items.

The sheltered area can extend over the bed 14 and over the roof 76 of the cab 12 to a position forward the roof 76 of the cab 12. The example tent includes an opening at an aft end to permit access to and from the sheltered area. The opening could be zippered shut when desired. The tent 44, particularly the rigid sections 100 can include windows 108, vents, or both. In some examples, seats can pivot out from the cab back 20, the sidewall 26, or the tailgate 28, to provide a seating area for an occupant within the cargo area 18.

The tent 44 can be attached to the truck 10 using fasteners, such as clips, to anchor the tent 44 when the platform assembly 40 is in the deployed position.

In this example, the tent 44 is attached to the frame assembly 48 and retracts when the platform assembly 40 is in stowed position. In other examples, the tent 44 can detached from the frame assembly 48 when the platform assembly 40 is in the stowed position. The tent 44 can then be draped over the frame assembly 48 when the platform assembly 40 is in the deployed position.

In some examples, the tent 44 can include an awning flap that can extend out to provide sheltered areas around the truck 10. In some examples, a salesperson at a farmers' market may utilize the awning flap to shelter themselves along with goods being offered for sale.

Referring to FIGS. 8-11 and the mounting points 80, the example mounting points 80 are pivotably coupled to front fenders 112 of the truck 10 on either side of a hood 116 that covers a storage area 120 or frunk. One of the mounting points is on a driver side of the hood 116 and the other one of the mounting points is on a passenger side of the hood 116.

When the mounting points 80 are not needed in a mounting position for latching to the support legs 56, the mounting points 80 can be flipped into a concealed position where the mounting points 80 are within the storage area 120 and covered by the closed hood 116. In some examples, the mounting points 80 can be used tie downs for cargo.

In the example truck 10, the cab back 20 is fixed. In other examples, the cab back 20 could be pivotable to an open position to provide a passthrough opening from the cargo area 18 within the bed 14 to the passenger compartment 16. A mattress or similar sized item could be positioned within the cargo area 18 and then extend partially into the passenger compartment 16.

Further, in the example shelter system 30, the platform assembly includes more than one panel. In other examples, the platform assembly could include a single panel. Further, the example frame assembly 48 pivots about a single axis, but other examples could include some portion of the frame assembly 48 pivoting up from an axis at a front of the bed 14, and other portions pivoting up from a rear of the bed 14.

Features of the disclosed examples include a shelter that, when not in use for shelter, can provide aerodynamic enhancements to a vehicle. The modular shelter does not take up substantial cargo space within the cargo bed so that bed capacity can be maintained.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A shelter system for a truck, comprising:
a platform assembly that can pivot back-and-forth between a stowed position and a deployed position, the platform assembly spanning a bed of a truck when in the stowed position, the platform assembly disposed over a cab of the truck when in the deployed position, the platform assembly including a first panel and a second panel pivotably connected to each other, the first panel and the second panel folded when the platform assembly is in the stowed position, the first panel and the second panel unfolded when the platform assembly is in the deployed position, wherein the platform assembly in the stowed position slopes downward from an upper, rear area of the cab to a tailgate of the truck; and a tent that covers the platform assembly when the platform assembly is in the deployed position.

2. The shelter system of claim 1, wherein a cab back of the truck is configured to open to provide a passthrough between a passenger compartment of the truck and the bed of the truck.

3. The shelter system of claim 1, wherein the second panel extends forward past a roof of the cab when the platform assembly is in the deployed position.

4. The shelter system of claim 3, further comprising at least one support leg that extends from the second panel to the truck to support the second panel when the platform assembly is in the deployed position.

5. The shelter system of claim 4, wherein the at least one support leg is pivotably connected to the second panel.

6. The shelter system of claim 4, wherein the at least one support leg comprises a first leg connectable to a first mounting point on a driver side of a hood of the truck, and a second leg connectable to a second mounting point on a passenger side of the hood of the truck.

7. The shelter system of claim 6, wherein the first leg is connectable to the first mounting point through a first latch, and the second leg is connectable to the second mounting point through a second latch.

8. The shelter system of claim 1, further comprising a frame assembly that supports the tent when the platform assembly is in the deployed position.

9. The shelter system of claim 1, further comprising a frame assembly having a plurality of support spokes that radiate from a pivot axis and are fanned out about the pivot axis when the platform assembly is in the deployed position, wherein some of the plurality of support spokes are connected to the platform assembly and some of the plurality of support spokes support the tent.

10. The shelter system of claim 9, wherein the pivot axis is adjacent an upper, rear corner of a cab of the truck.

11. The shelter system of claim 1, wherein the tent is folded when the platform assembly is the stowed position and is unfolded when the platform assembly is in the deployed position.

12. The shelter system of claim 1, further comprising a pair of side panels that cover outboard areas of the platform assembly and the tent when the platform assembly is in the stowed position.

13. The shelter system of claim 1, further comprising at least one support leg that extends from the platform assembly to the truck to support the platform assembly when the platform assembly is in the deployed position, wherein the at least one support leg is connectable to a mounting point that is pivotably back-and-forth between a mounting position and a concealed position.

14. A shelter system for a truck, comprising:

a platform assembly that can pivot back-and-forth between a stowed position and a deployed position, the platform assembly spanning a bed of a truck when in the stowed position, the platform assembly disposed over a cab of the truck when in the deployed position;

a tent that covers the platform assembly when the platform assembly is in the deployed position, wherein the platform assembly includes a first panel and a second panel pivotably connected to each other, the first panel and the second panel folded when the platform assembly is in the stowed position, the first panel and the second panel unfolded when the platform assembly is in the deployed position, wherein the second panel extends forward past a roof of the cab when the platform assembly is in the deployed position; and at least one support leg that extends from the second panel to the truck to support the second panel when the platform assembly is in the deployed position, wherein the at least one support leg comprises a first leg connectable to a first mounting point on a driver side of a hood of the truck, and a second leg connectable to a second mounting point on a passenger side of the hood of the truck, wherein the first mounting point and the second mounting point are pivotable back-and-forth between a mounting position and a concealed position.

15. A method of establishing a shelter for a truck, comprising:

using a platform assembly as an aerodynamic shield that spans a bed of a truck when the platform assembly is in a stowed position, the aerodynamic shield sloping downward from an upper, rear area of a cab of a truck to a tailgate of the truck when in the stowed position and used as an aerodynamic shield;

pivoting the platform assembly to a deployed position where the platform assembly spans a roof of the truck; and supporting a portion of the platform assembly that extends forward of the roof with at least one support leg that extends from the platform assembly to the truck.

16. The method of claim 15, further comprising unfolding a tent during the pivoting, the tent covering the platform assembly when the platform assembly is in the deployed position.

17. The method of claim 16, further comprising rotating a plurality of support spokes about a pivot axis when transitioning back-and-forth between the stowed position and the deployed position, the plurality of support spokes radiating from the pivot axis and fanned out about the pivot axis when the platform assembly is in the deployed position, wherein some of the plurality of support spokes are connected to the platform assembly and some of the plurality of support spokes support the tent when the platform assembly is in the deployed position.

18. The method of claim 15, wherein the platform assembly comprises a first panel and a second panel that are folded together when the platform assembly is in the stowed position and that are unfolded when the platform assembly is in the deployed position.

19. The method of claim 15, further comprising pivoting a mounting point on the truck from a concealed position to a mounting position, and connecting at least one support leg to the mounting point such that the at least one support leg supports the platform assembly when the platform assembly is in the deployed position.

* * * * *